(12) United States Patent
Chiu

(10) Patent No.: US 7,646,818 B2
(45) Date of Patent: Jan. 12, 2010

(54) METHOD AND RELATED SYSTEM FOR HIGH EFFICIENCY ADVERTISING DETECTION

(75) Inventor: Andy Chiu, Taipei Hsien (TW)

(73) Assignee: VIA Technologies Inc., Hsin-Tien, Taipei Hsien (TW)

( * ) Notice: Subject to any disclaimer, the term of this patent is extended or adjusted under 35 U.S.C. 154(b) by 849 days.

(21) Appl. No.: 10/904,266

(22) Filed: Nov. 1, 2004

(65) Prior Publication Data

US 2006/0020961 A1    Jan. 26, 2006

(30) Foreign Application Priority Data

Jul. 22, 2004    (TW)    .............. 93121903 A

(51) Int. Cl.
    *H04N 7/12*    (2006.01)
(52) U.S. Cl. .................. 375/240.25; 348/700
(58) Field of Classification Search .............. 375/240; 348/700
    See application file for complete search history.

(56) References Cited

U.S. PATENT DOCUMENTS

| 5,333,091 | A | * | 7/1994 | Iggulden et al. | ............... 386/55 |
| 5,440,336 | A | * | 8/1995 | Buhro et al. | .................. 725/93 |
| 6,002,443 | A | * | 12/1999 | Iggulden | .................... 348/553 |
| 6,157,744 | A | * | 12/2000 | Nagasaka et al. | ........... 382/236 |
| 2002/0054242 | A1 | * | 5/2002 | Suito et al. | .................. 348/700 |

FOREIGN PATENT DOCUMENTS

CN    1543096 A    11/2004

* cited by examiner

*Primary Examiner*—Tung Vo
*Assistant Examiner*—Anner Holder
(74) *Attorney, Agent, or Firm*—Winston Hsu

(57) ABSTRACT

In the video signals provided by broadcasting media, advertising sections are inserted between normal programs, thus causing interruption. An end portion of the normal program will be repeated before an advertising section ends. The invention determines the continuity of two adjacent frames, to search for frame discontinuity to find out if there is a frame similar to a next given frame. If a similar frame is found to have an advertising frame, an advertisement is detected.

19 Claims, 7 Drawing Sheets

METHOD AND RELATED SYSTEM FOR HIGH EFFICIENCY ADVERTISING DETECTION

BACKGROUND OF INVENTION

1. Field of the Invention

The present invention relates to a method and related system for detecting advertisements in video signals, more particularly, to a method and related system for high efficiency advertising detection.

2. Description of the Prior Art

In modern society, one of the main information sources is audio and visual programming provided by either cable or public television broadcasting media. Viewers can obtain news, knowledge, information, or even entertainment programs from the service provided. Because of commercial considerations, broadcasting media usually has advertisements inserted in between programs. Viewers have to suffer with these advertisements when they disrupt normal viewing of programs and waste the viewers' time. If a viewer wants to record a normal program for future viewing, these advertisements will use up the recording medium and hence the viewer is not able to search, manage and retrieve information easily from the recording medium. Current technology lacks of a method and related system for detecting advertisements.

SUMMARY OF INVENTION

When there exists a difference in adjacent frames, there may be a possible advertisement insertion point. The claimed invention comprises a method and related system for detecting advertisements, where the method performing a difference comparing step to determine a difference between the frames of the video signal, and then doing a forward search until a similar frame is found. If this fixed frame has a similar frame, it can be evaluated that it is the similar frame before advertisement is inserted, and thus it should be the same frame that is repeated after the advertisement. In this way, it is capable to predict the next incoming advertisement. Besides, if the two adjacent frames do not have a big difference, it represents the two frames belong to a series of gradually changing images that are not insertion points of advertisements and therefore there is no need to do a forward search. This reduces the number of forward searches. Furthermore, when performing a forward search and comparison on a fixed frame, a previous frame is registered, and it requires only to register the feature information of a discontinued frame, a comparison between the feature information of a discontinued frame with every registered feature information in order to determine whether the fixed frame has any similarity. The above-mentioned procedure simplifies the sequence of detecting advertisements, and hence reduces the use of system resources and increases efficiency.

Furthermore, a signal processing system capable of detecting advertising sections in video signals is disclosed. The signal processing system comprises: a difference comparing module for temporarily storing a video signal, wherein the video signal is capable of providing a plurality of different frames to show a dynamic image according to a sequential order; a difference comparing module for determining a difference between each frame of the video signal, wherein if a difference between a frame and a prior frame is more than a threshold difference, the difference comparing module provides corresponding difference information according to the frame; a similarity comparing module for determining a similarity between each frame of the video signal and a reference frame, wherein if a similarity between a frame and the reference frame is more than a threshold similarity, the similarity comparing module is capable of providing corresponding similarity information according to the frame.

A recording system capable of filtering advertisements in video signals is disclosed. The recording system comprises: a video decoder unit for decoding video signals and filtering out advertisements, wherein a frame buffer unit is capable of storing decoded signals and sending a decoded signal to a display control unit to be shown on a display device. The advertisement detecting system is capable of gaining decoded signals based on a plurality of different frames in a predetermined formula and opposition variation value, to predict incoming advertisements. The advertisement filtering system is capable of forming filtered video signals based on the advertisement detecting system, and to send these to the video decoding unit to process decoding to be accessed later.

The claimed invention comprises a method and related signal processing system capable of detecting advertisement video signals, it enables the user to skip, filter or edit advertisements and allows the user to perform and access programs provided by broadcast media efficiently.

DETAILED DESCRIPTION

Figure 1:
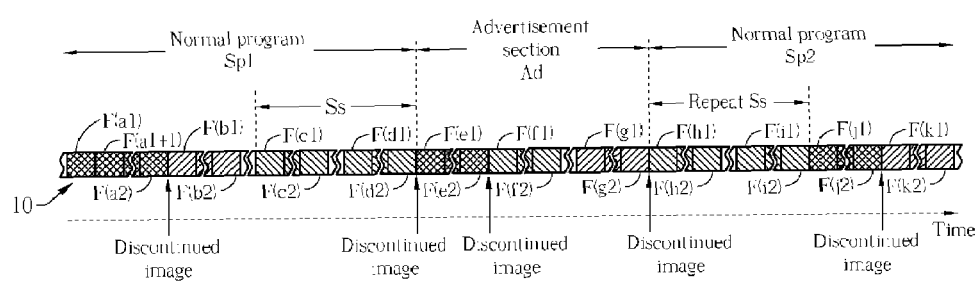
FIG. 1 is a diagram of an insertion of an advertisement into a normal program.

Please refer to FIG. 1, which illustrates a video signal 10 that sequentially provides different frames at different times. The sequence of frames F(a1), F(a1+1) ... to F(a2), F(b1) to F(b2) until F(k1) to F(k2) show a motion picture or video. As mentioned previously, advertisements are inserted in between programs in the video signal 10. Advertisement section Ad is inserted in between programs Sp1 and Sp2. Please note that frames F(a1), F(a1+1) to F(a2), F(b1) to F(b2) ... until F(c1) to F(c2) and F(d1) to F(d2) are used to show the frames of program Sp1. Frames F(h1) to F(h2), F(i1) to F(i2), F(j1) to F(j2) and F(k1) to F(k2) and so on, are used to show the frames of program Sp2. Frames F(e1) to F(e2), F(f1) to F(f2) and so on until F(g1) to F(g2) are used to show the dynamic images of the advertisement section Ad.

As known by those skilled in the art, the same series of dynamic images (such as dynamic images of the same scene) can be shown by a series of frames, which have gradual changes. Whether it is a normal program or advertisement, both are composed of different series of dynamic images. Please refer to video signal 10 in FIG. 1 again, frames F(a1), F(a+1) and so on until F(a2) in program Sp1 form a series of gradual changing frames and are used to show a series of dynamic images. Under the same principle, frames F(b1) to F(b2), F(c1) to F(c2), F(d1) to F(d2), F(e1) to F(e2), F(f1) to F(f2), F(g1) to F(g2), F(h1) to F(h2), F(i1) to F(i2), F(j1) to F(j2) until F(k1) to F(k2) and so on, also form a series of gradual changing frames and are all used to show a different series of dynamic images.

In the same series of dynamic images, two successive frames display a gradual change and also show continuity on the screen image. Frames like F(a1), F(a1+1) belong to the same gradual changing series, they also demonstrate continuity. In another words, between frames F(a1) and F(a1+1), there is only a small difference in continuity. In contrast to similarities between frames corresponding to the same series, there are greater differences between frames corresponding to the different series of dynamic images. For example, when frames F(a1) to F(a2) and F(b1) to F(b2) are used to show two different levels of dynamic image series, two successive frames F(a2) and F(b1) are two different series placed at a transition and thus the discontinuity of frames occurs. Under the same principle, if frames F(e1) to F(e2), F(f1) to F(f2) belong to different series of dynamic images, then successive frames F(e2) and F(f1) are also different and hence form a discontinuity in screen image. The difference between advertisements and normal programs is in the different series of dynamic images formed, therefore a discontinuity of images will definitely occur in the transitions between advertisements and normal programs. Like in FIG. 1, successive frames F(d2) and F(e1), F(g2) and F(h1) will also have a discontinuity in screen image. In other words, a discontinuity in screen images will definitely occur in the insertion of advertisement section Ad.

Modern broadcasting outlets will typically repeat an end portion of a program before the advertisement ends to allow viewers to recall the previous content in the program. In FIG. 1, frames F(c1) to F(d2) form Ss, an end portion of the program. When advertisement Ad ends, normal program Sp2 will repeat an end portion Ss. In other words, frame F(h1) to F(i2) and F(c1) to F(d2) have the same images.

In the above mentioned, we can see that in the frames before and after the advertisement section have two characteristics. Firstly, a discontinuity of images exists. Secondly, there is a repeat of frames as there is a repeat of the end portion of the normal program. Hence the invention uses these characteristics to proceed with advertisement detection. Please refer to FIG. 2, as FIG. 2 demonstrates an embodiment by using mathematical calculation.

Figure 2:
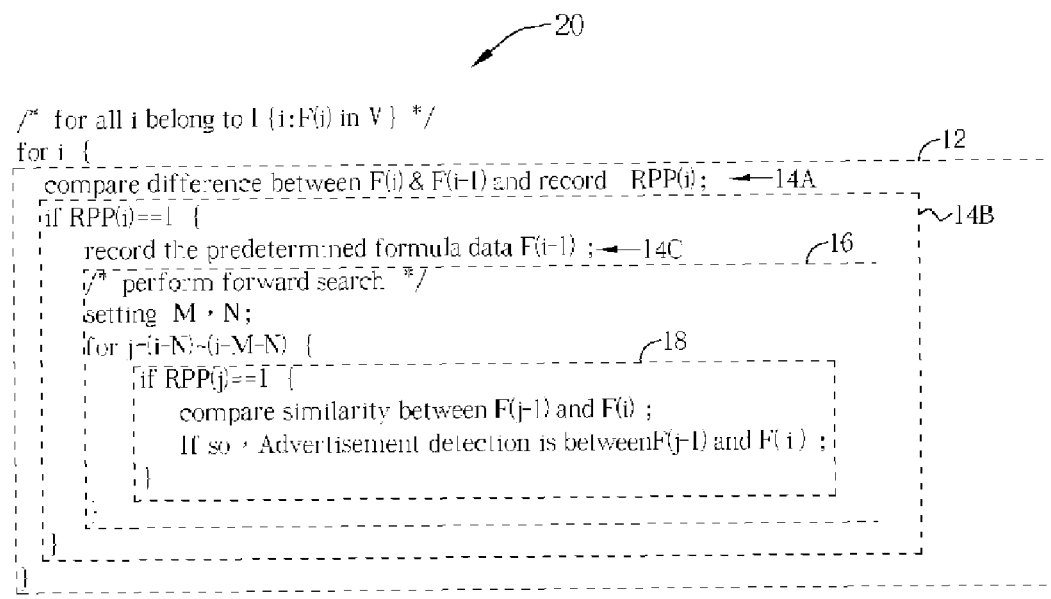
FIG. 2 illustrates an algorithm according to the present invention.

In FIG. 2, an algorithm 20 shows that when the invention is directed at video signal V during an advertisement detection, the video signal V is capable of providing a plurality of different frames to show a dynamic image according to a sequential order. Before the i-th frame F(i) in video signal V proceeds with sequence 12, and step 14A is first taken to compare the difference in continuity between frame F(i) and the previous frame F(i−1) and record the difference in a comparison result which corresponds to an opposition flag RPP(i). If the difference in frame F(i−1) and F(i) is large, it means that a discontinuity of images exists and the value of the opposition flag RPP(i) is set to 1. On the other hand, if the difference is small, RPP(i) is set to 0. To practically realize this step, features of frame F(i) and F(i−1) can be respectively characterized with data E(i) and E(i−1) using a predetermined formulation. If the difference in between data E(i) and E(i−1) is greater than a threshold difference, then the opposition flag RPP(i) will be set to 1, on the contrary it will be set to 0. The calculated data E(i) can be the characteristic data of frame F(i) (like luminance or chrominance information), or a distribution of all pixel information either in a distribution of luminance, chrominance or histogram, or a frequency-domain transformation result corresponding to the frame F(i) (such as a two dimensional cosine transformation). Basically, the size of data E(i) is smaller than the pixel data of the frame F(i), so as to accelerate step 14A.

After executing step 14A, algorithm 20 will proceed to sequence 14B. In sequence 14B, if the value of opposition flag RPP(i) is 1, frame F(i) will be set as a reference frame. And in step 14C, corresponding predetermined formula data is recorded (like previously mentioned data, E(i−1)). At the same time, sequence 16 can be started to perform a forward search. When the value opposition flag RPP(i) is 1, there is a discontinuity of images in between representing frames F(i−1) and F(i). This may be due to the insertion of an advertisement or the transition of different series of dynamic images. To further determine this before moving on to forward search in sequence 16, a search is performed to check whether there is any frame similar to frame F(i). If frame F(j) and F(i) are similar (or close to identical), frame F(i) and F(j) belong to the same series of dynamic images and F(i), sequentially placed behind F(j), is the repeated end portion of a program. Therefore, it can be predicted that the advertisement section exists between frame F(j) and F(i).

As shown in FIG. 2, before proceeding to the forward search in sequence 16, the search parameters M, N can be set. Frames F(i-N) to F(i-M-N) can be considered forward search frames, which start from frames F(i-N), F(i-N−1) until F(i-M-N) to the next (j) frame F(j) to begin sequence 18. In sequence 18, it can first be determined whether the opposition flag value is 1 in frame F(j). When the value is 1, a further step is taken to compare the similarity between frame F(j−1) and F(i). If the similarity is high, it represents that F(i) is the repeat of F(j−1) and the advertisement section should be between F(j−1) and F(i). On the contrary, if no frame is found similar to F(i) within the parameter, then there is no continuity that may be due to a different series in the dynamic images (i.e. scene change), and not the insertion of an advertisement between frames F(i), F(i−1).

In executing the sequence 18, the predetermined formula data from frames F(j−1) and F(j) are used for comparison. If the difference in the predetermined formula data of the corresponding frames is smaller than the threshold difference, the similarity of frames F(j−1) and F(i) is larger than the threshold difference. Thus, both frames can be considered similar and belonging to the same series of dynamic images.

From sequence 18 in algorithm 20, the invention does not need to forward search every frame (from F(i-M) to F(i-M-N)) when comparing similarity, only to compare the similarity of the corresponding frames F(j−1) and F(i) when the opposition flag RPP(j) is 1. As the aim of forward search is to examine whether frame F(i) is a repeat frame at the end of the advertisement section, it is sufficient to compare the first frame before the start of advertisement section and F(i). Although during the execution of sequence 18, it is not known which frame lies before the start of the advertisement section, but it is certain that this frame lies before a discontinued frame. Therefore it is sufficient only to compare frame F(i) and the frame that lies before a discontinued frame. As a result in sequence 18, the opposition flag RPP(j) is used to show the discontinuity between frames F(j−1) and F(j), only when the opposition flag RPP(j) is 1, so a comparison in similarity between frames F(i) and F(j−1) (which is also the frame before a discontinued frame) is executed.

When the forward search is directed at frame F(i), in order to do a comparison with frame F(j), a related characteristic data E(j) from frame F(j) is recorded. To operate the forward search successfully, only the characteristic data of the frame before the discontinuity image needs to be recorded. The above factors allow a fast, highly efficient, and low system usage execution of the method of the invention.

Figure 3:
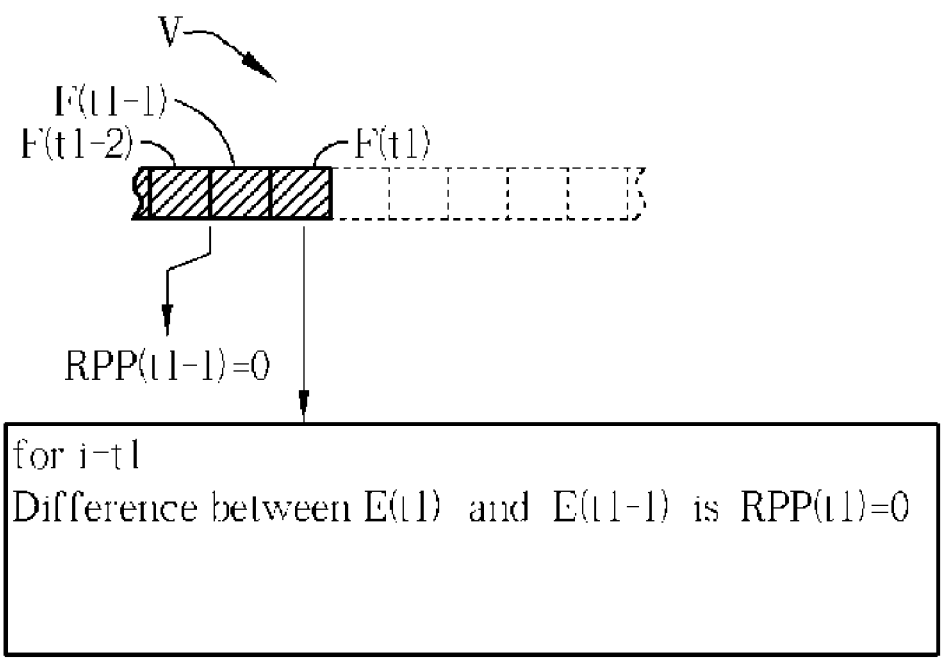
FIGS. 3-5 illustrate how an advertisement is detected in the video signal by the algorithm of FIG. 2.
Figure 4:
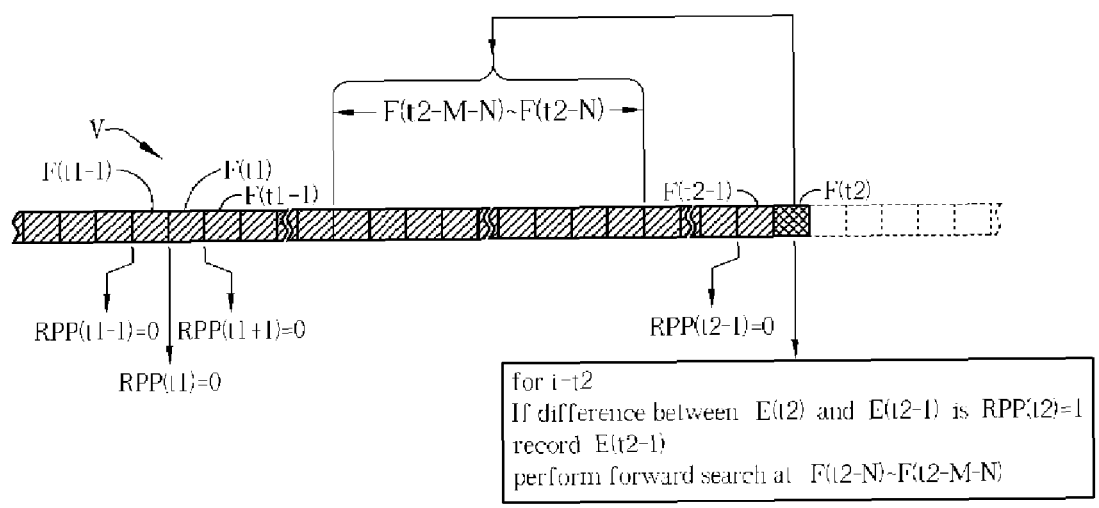
Figure 5:
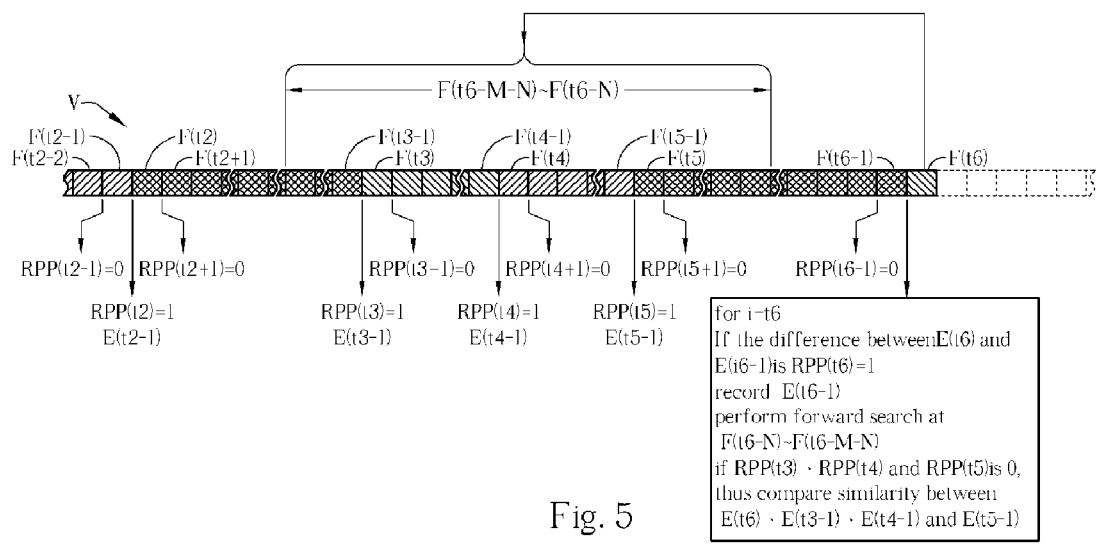

To further explain algorithm 20, please refer to FIG. 3 to FIG. 5 (at the same time also to FIG. 2). FIG. 3 to FIG. 5 show how advertisement detection is carried out. Firstly, FIG. 3 shows that if the algorithm 20 proceeds sequentially on frame t1 in the video signal V, which also means i=t1. Therefore, step 14 in algorithm 20 can begin to compare the differences between frames F(t1) and F(t1−1), and also calculate the corresponding opposition flag RPP(t1) at the same time. As mentioned above, step 14 is based on the differential comparison of the predetermined formula data E(t1−1) and E(t1) respectively corresponding to frames F(t1−1) and F(t1). In FIG. 3, if F(t1) and F(t1−1) are gradually changing frames which belong to the same series of dynamic images, then the differential between them is small, hence the corresponding opposition flag RPP(t1) value is 0. As the value appears to be 0 after running step 14A, all other sequences will not proceed and there is no need to record predetermined formula data E(t1−1) and the memory will be reset. Algorithm 20 can move on to a next frame F(t1+1) (i=t1+1).

Following the example from FIG. 3, in FIG. 4, if the algorithm 20 has proceeded to frame F(t2), which is i=t2 in FIG. 2, at the same time sequence 12 starts. At this moment, if frames F(t2) and F(t2−1) belong to different series of dynamic images, then the differential is sufficient to create a discontinued image which causes the corresponding opposition flag RPP(t2) value to be 1. The algorithm 20 will also proceed to sequence 14B after step 14A is completed. In step 14C, frame F(t2) is set as a reference frame, and thus the predetermined formula data E(t2−1) is recorded when the sequence 16 begins a forward search. Sequence 16 examines the value of opposition flag RPP which corresponds to frames from F(t2-M-N) to F(t2-N). In an example in FIG. 4, if the opposition flag value 0 corresponds to these frames, then flags RPP(t2-M-N) to RPP(t2-N) are also 0. The algorithm 20 is then not needed to perform the sequence 18 to compare the similarity. After sequence 12 ends on frame F(t2), predetermined formula data E(t2−1) corresponding to F(t2−1) is saved. The algorithm 20 then will continue to the next frame F(t2+1).

Continuing the examples from FIG. 3 and FIG. 4, in FIG. 5, if the algorithm 20 proceeds to F(t6) (in FIG. 2 i=t6), the sequence 12 starts. As the example in FIG. 5 shows, if the frames F(t6−1) and F(t6) have high differentials and the value of opposition flag RPP(t6) is 1, the algorithm 20 proceeds to sequence 14B. In sequence 16, the forward search proceeds to find out whether the value of the opposition flag that corresponds to frames from F(t6-M-N) to F(t6-N) is 0. In the example in FIG. 5, the target frame is within the set parameter and the value of the each opposition flags RPP(t3), RPP(t4) and RPP(t5) of the corresponding frames F(t3), F(t4) and F(t5) is 1. In the sequence 18, the algorithm 20 applies these values j=t3, t4 and t5 to frames F(t3−1), F(t4−1) and F(t5−1) and F(t6) to get a similarity comparison by comparing their differences. Please be aware that, as opposition flags RPP(t3), RPP(t4) and RPP(t5) all have the value of 1, the value of data E(t3−1), E(t4−1) and E(t5−1) which correspond with frames F(t3−1), F(t4−1) and F(t5−1) have already been recorded. In the processing sequence 18, the predetermined formula data E(t6) which corresponds to frame F(t6) is used to perform the comparison with data E(t3−1), E(t4−1) and E(t5−1). If the differential value is high between frames F(t6) and F(t4−1), it can be predicted than an advertisement is inserted in between these frames.

Figure 6:
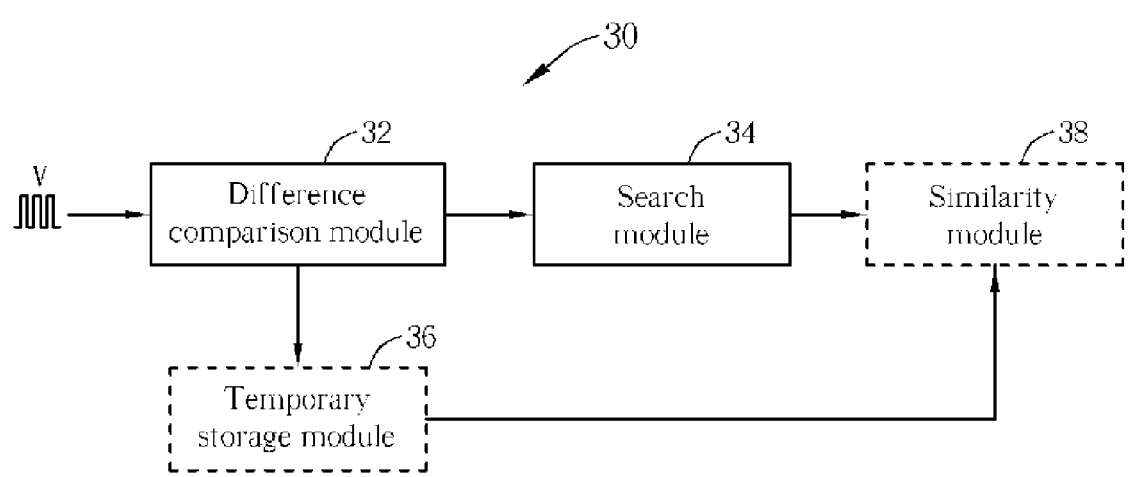
FIG. 6 is a block diagram of a signal processing system of an embodiment according to the present invention.

Please refer to FIG. 6 (also to FIG. 2). The algorithm 20 in FIG. 2 utilizes a signal processing system 30 shown in FIG. 6. The signal processing system 30 comprises a difference comparison module 32 and search module 34. The difference comparison module 32 utilizes video signals V in step 14A (see FIG. 2). When executing a forward search, search module 34 synchronizes sequence 16. The signal processing system 30 can also comprise a similarity module 38 for receiving output from a temporary storage module 36 to compare similarity in sequence 18. The temporary storage module 36 is capable of supporting memory resources needed by the above-mentioned modules, like temporarily storing corresponding differential indexes for each frame for step 14. When needed, it stores the characteristics of related frames. The signal processing system 30 can be placed in a recording device that replays video on videotapes, compact discs, hard disks, etc., to detect advertisements in the recorded video signals. All the modules in the signal processing system 30 can be embodied through firmware and hardware. For example, the functions of difference comparison module 32, the search module 34 and the similarity module 38 can be controlled by a single firmware processor, and the temporary storage module 36 can be controlled by a computer memory (like a computer random access memory). The signal processor system 30 can also be placed in a multi-media computer. Multi-media computers today are capable of storing video signals into either hardware or compact discs. The signal processing system 30 can be used immediately to detect advertisements in video signals. For example, video signals can be obtained from either hardware or a compact disc, whereas the function of difference module 32, search module 34 and similarity module 38 are all controlled by central processor unit (or display card) in a computer and are executed by a software program.

While practically realizing a forward search, the frame parameters (settings M, N) can be set depending on the situation. For example, if the broadcasting media inserts an advertisement of more than 30 seconds, and every second is equal to 60 frames, in FIG. 2, N can be set to 1800 frames (30 multiplied by 60). Also, since the advertisement inserted usually has a time limit (for example, one advertisement cannot run longer than 5 minutes), the value of M in the forward search can be set based on the above-mentioned. According to a similar theory, it is possible to preset the temporary storage module 36 for the size of memory needed by the signal processing system 30. The forward search parameters M and N in the algorithm 20 can also be variable, for example, they can change according to index i of frame F(i).

Figure 7:
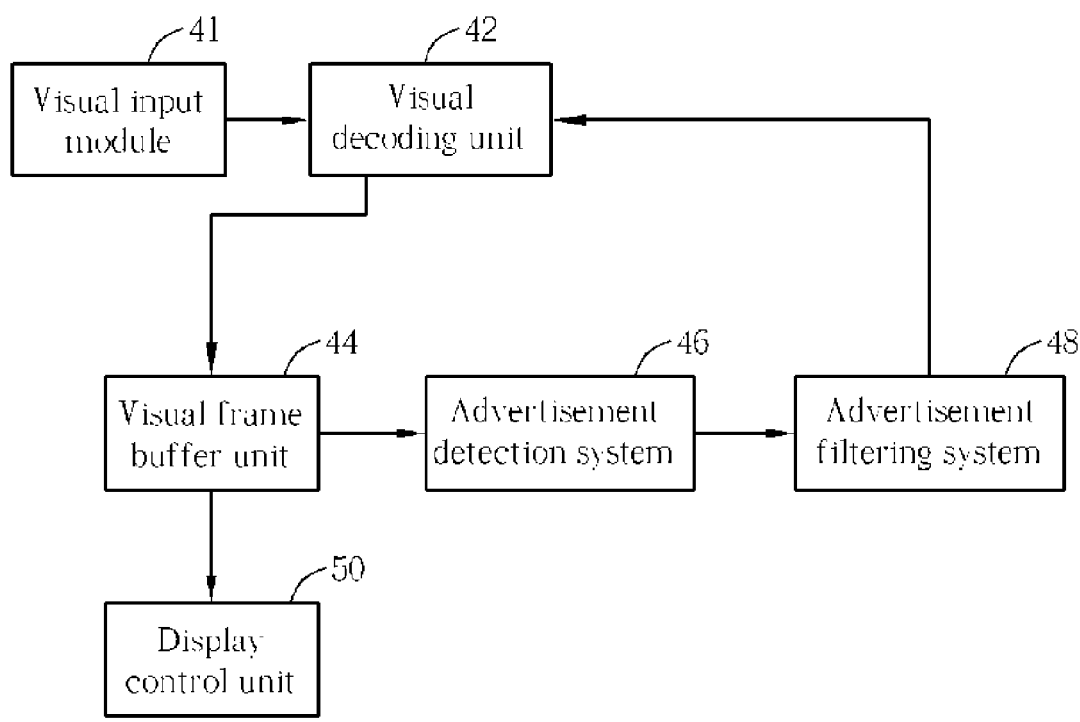
FIG. 7 is a block diagram of a recording system of an embodiment according to the present invention.

FIG. 7 shows a functional flowchart of a recording system according to the invention. The recording system 40 can either be a video recording device, a compact disc recording device, a hard disk recording device, or a multi-media computer that uses a hard disk or compact disc to store video signals. The recording system 40 comprises a video decoder 42 for decoding video signals and rearranging video signals of filtered advertisements, a video frame buffer unit 44 for storing decoded video signals to transfer to a display control unit 50, an advertisement detecting system 46 for detecting an advertisement according to the predetermined formula and opposition flag of each decoded video signal frame, and an advertisement filter system 48 for using video signals based on advertisements filtered by the advertisement detecting system 46 and sending these to the video decoder unit 42 for code arrangement. The recording system 40 also comprises a video input module 41 for receiving video signals to transfer to the video decoder unit 42 for decoding, wherein these video signals follow sequential frames to show dynamic images. In addition, the advertisement detecting system 46 comprises a difference comparison module 461 that compares every decoded frame in a video signal in sequence, and therefore sets a pair of differential indicators and a reference frame; and a searching module 462 for searching for a target frame with the same differential indicator within a number of set frames prior to the reference frame, to determine an advertisement section. The advertisement system 46 also comprises a temporary storage system 463 for storing each frame that corresponds to the characteristic of one frame prior to the opposition flag and each reference frame; and a similarity module 464 to execute comparison similarity. The modules in the advertisement detection system 46 are implemented by either firmware or hardware.

In the prior art, there is no efficient way to detect advertising sections in a video signal. Therefore, users cannot efficiently use information of the video signal. In contrast to the prior art, the present invention detects different characteristics of an inserting position of the advertising section automatically with low calculation and memory resource consumption, assists users in skipping and filtering out the advertisements. This allows users to more easily and efficiently store, edit and utilize useful program information of the video signal.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for detecting an advertisement in a video signal, the method comprising:

performing a difference comparing step between characteristics of sequential frames of the video signals to set relative differential indicators, wherein if the difference between the frame and the prior frame is more than a threshold difference, the frame becomes a reference frame;

searching for a target frame with the same relative differential indicator within a plurality of frames prior to the reference frame, wherein the reference frame is not consecutive to the target frame; and performing a similarity comparison step between characteristics of a frame prior to the target frame and the reference frame to determine the location of an advertisement section.

2. The method of claim 1, wherein the advertisement section begins from the target frame to the frame prior to the reference frame.

3. The method of claim 1, further comprising: storing the characteristic of every frame prior to the reference frame.

4. The method of claim 1, further comprising:

performing a search for a plurality of target frames; and performing the similarity comparing step to determine a similarity between characteristics of the plurality of target frames and the characteristic of the reference frame.

5. The method of claim 4, wherein if the similarity is more than a threshold similarity, one frame of the plurality of target frames is chosen with the highest similarity and predicts the location of a series of frames in the advertisement section from the frame with highest similarity to the frame prior to the reference frame.

6. A signal processing system capable of detecting an advertisement in a video signal, the signal processing system comprising:

a difference comparing module for performing a difference comparing step to determine a difference between a frame and a prior frame of the video signal in order to set a relative differential indicators, wherein if the difference between the frame and the prior frame is more than a threshold difference, the frame becomes a reference frame;

a searching module coupled to the difference comparing module, for searching a target frame with the same relative differential indicator within a plurality of frames prior to the reference frame, wherein the reference frame is not consecutive to the target frame; and a similarity comparing module coupled to the searching module, for performing a similarity comparison step between characteristics of a frame prior to the target frame and the reference frame to determine the location of an advertisement section.

7. The signal processing system of claim 6, wherein the similarity comparing module causes the searching module to search for a plurality of target frames and performs a similarity comparing step to determine a similarity between characteristics of the plurality of target frames and the reference frame.

8. The signal processing system of claim 6, further comprising:

a buffer module for receiving the video signal.

9. The signal processing system of claim 6, wherein the difference comparing module and the search module carry out different firmware instructions upon execution of a processing device.

10. The signal processing system of claim 6, wherein the system can be placed in either a recording device or a multimedia computer.

11. The signal processing system of claim 10, wherein the system can be placed in a video tape recording device, compact disc recording device, hard disk recording device, or multi-media computer that uses a hard disk or a compact disc to store video signals.

12. The signal processing system of claim 6, further comprising:

a temporary storage system for providing memory resources to the signal processing system and for storing each frame corresponding characteristic of each frame prior to an opposition flag and each reference frame.

13. A recording system capable of filtering advertisements in a video signal, the recording system comprising:

a video decoder unit for decoding video signals and re-arranging filtered advertisements;

a video frame buffer unit for storing decoded video signals and transferring decoded video signals to a display control unit;

an advertisement system for detecting advertisements according to a predetermined formula and opposition flags of each decoded video signal frame;

an advertisement filtering system for forwarding video signals based on advertisements filtered by the advertisement detecting system to the video decoder unit for code arrangement;

a difference comparing module for performing a difference comparing step to determine a difference between a frame and a prior frame of the video signal in order to set relative differential indicators and a reference frame;

a searching module coupled to the difference comparing module, for searching a target frame with the same differential indicator within a plurality of frames prior to the reference frame, wherein the reference frame is not consecutive to the target frame; and a similarity comparing module coupled to the searching module, for performing a similarity comparison step between characteristics of a frame prior to the target frame and the reference frame to determine the location of an advertisement section.

14. The recording system of claim 13, wherein the similarity comparing module causes the searching module to search a plurality of target frames and performs a similarity comparing step to determine a similarity between characteristics of the plurality of target frames and a characteristic of the reference frame.

15. The recording system of claim 13, further comprising:
a temporary storage system for storing each frame corresponding characteristic of each frame prior to an opposition flag and each reference frame.

16. The recording system of claim 13, further comprising:
a video input module for receiving the video signal and transferring the video signal to the video decoder unit.

17. The method of claim 1, wherein the frame prior to the target frame is the same as the reference frame.

18. The signal processing system of claim 6, wherein the frame prior to the target frame is the same as the reference frame.

19. The recording system of claim 13, wherein the frame prior to the target frame is the same as the reference frame.

* * * * *